(12) United States Patent
Mamak et al.

(10) Patent No.: US 8,268,202 B2
(45) Date of Patent: Sep. 18, 2012

(54) POTASSIUM CESIUM TUNGSTEN BRONZE PARTICLES

(75) Inventors: Marc Andrew Mamak, Maineville, OH (US); Urs Lehmann, Basel (CH); Urs Leo Stadler, Madison, NJ (US); Ralf Stefan Knischka, Neustadt (DE)

(73) Assignee: BASF SE, Ludwigshafen (DE)

( * ) Notice: Subject to any disclaimer, the term of this patent is extended or adjusted under 35 U.S.C. 154(b) by 95 days.

(21) Appl. No.: 12/827,373

(22) Filed: Jun. 30, 2010

(65) Prior Publication Data

US 2011/0248225 A1 Oct. 13, 2011

Related U.S. Application Data

(60) Provisional application No. 61/223,519, filed on Jul. 7, 2009.

(51) Int. Cl.
| | |
|---|---|
| *F21V 9/04* | (2006.01) |
| *F21V 9/06* | (2006.01) |
| *G02B 5/22* | (2006.01) |
| *G02B 5/26* | (2006.01) |
| *C09D 11/00* | (2006.01) |
| *C09D 1/00* | (2006.01) |

(52) U.S. Cl. ............... 252/587; 106/31.13; 106/286.2; 106/479; 501/1; 501/32; 524/91; 524/100; 524/115; 524/186; 524/236; 524/323; 524/406

(58) Field of Classification Search ............... 252/587; 106/31.13, 286.2, 479; 264/1.1, 171.25; 428/328; 501/1, 32; 524/91, 100, 115, 186, 524/236, 323, 406
See application file for complete search history.

(56) References Cited

U.S. PATENT DOCUMENTS

| | | | | |
|---|---|---|---|---|
| 7,232,473 | B2 * | 6/2007 | Elliott | 75/245 |
| 2005/0271566 | A1 * | 12/2005 | Yadav | 423/1 |
| 2006/0178254 | A1 * | 8/2006 | Takeda et al. | 501/1 |
| 2006/0257716 | A1 * | 11/2006 | Christian | 429/44 |
| 2007/0187653 | A1 * | 8/2007 | Takeda et al. | 252/500 |
| 2008/0116426 | A1 | 5/2008 | Adachi | |

OTHER PUBLICATIONS

J. Am. Ceram. Soc. 90[12], 4059-4061 (2007).

* cited by examiner

*Primary Examiner* — Bijan Ahvazi
(74) *Attorney, Agent, or Firm* — Tyler A. Stevenson

(57) ABSTRACT

Disclosed are potassium cesium tungsten bronze solid solution particles of the formula $K_xCs_yWO_z$, where $x+y \leq 1$ and $2 \leq z \leq 3$. The particles are for instance micron or nano scaled particles. Also disclosed are organic or inorganic compositions comprising an organic or inorganic substrate and incorporated therein the present potassium cesium tungsten bronze solid solution particles. The substrates are for instance plastics, coatings, inks, adhesives, ceramics or glass. Also disclosed is a method for the preparation of the present potassium cesium tungsten bronze solid solution particles, which method comprises mixing a suitable tungsten source with a salt of potassium and a salt of cesium to form a powder mixture and exposing the powder mixture to a plasma torch under a reducing atmosphere. The present tungsten bronze particles are suitable NIR absorbers and heat shielding additives.

26 Claims, 5 Drawing Sheets

Fig. 1: UV-VIS-NIR Spectra of $K_{0.24}Cs_{0.15}WO_3$ in 0.15 mm PETG film
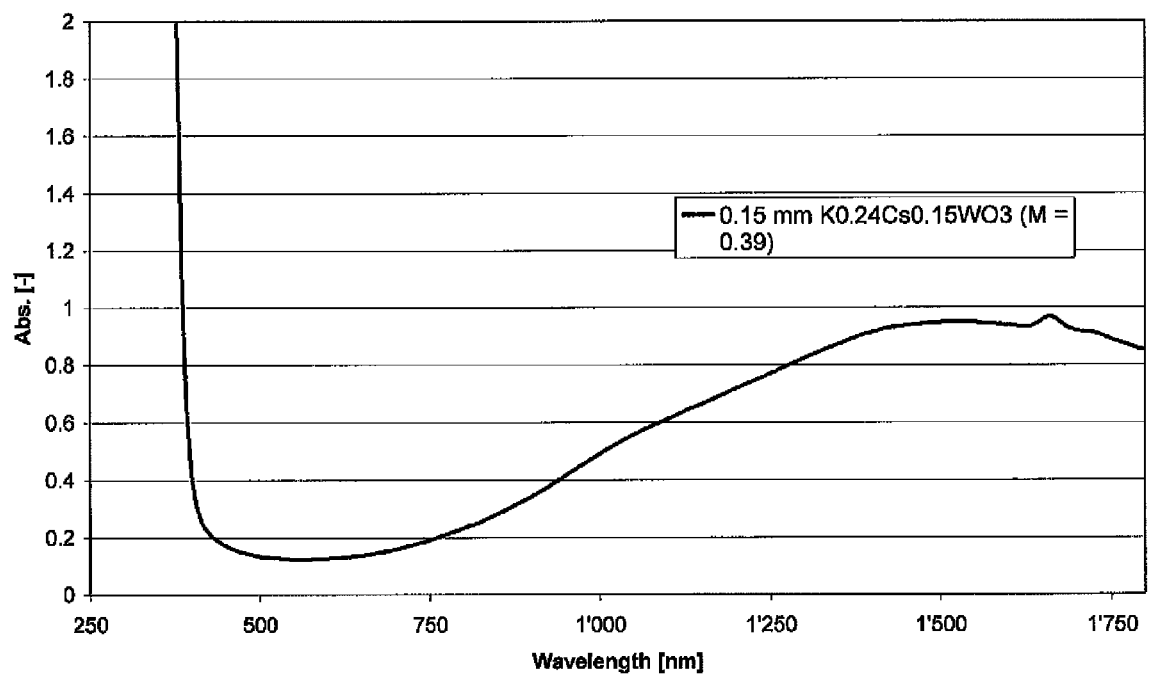

Fig. 2: UV-VIS-NIR-Spectrum of $K_{0.24}Cs_{0.15}WO_3$ in plasticized PVB 1 mm plaque
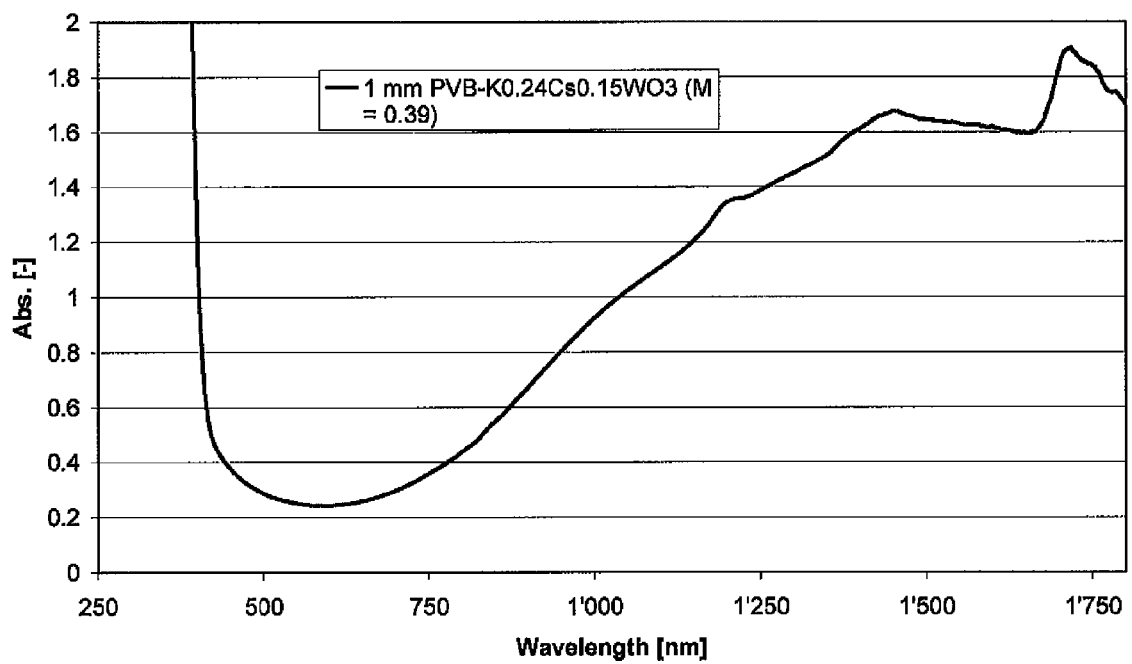

Fig. 3: UV-VIS-NIR-Spectrum of $K_{0.24}Cs_{0.16}WO_3$ in 0.45 mm PVC film
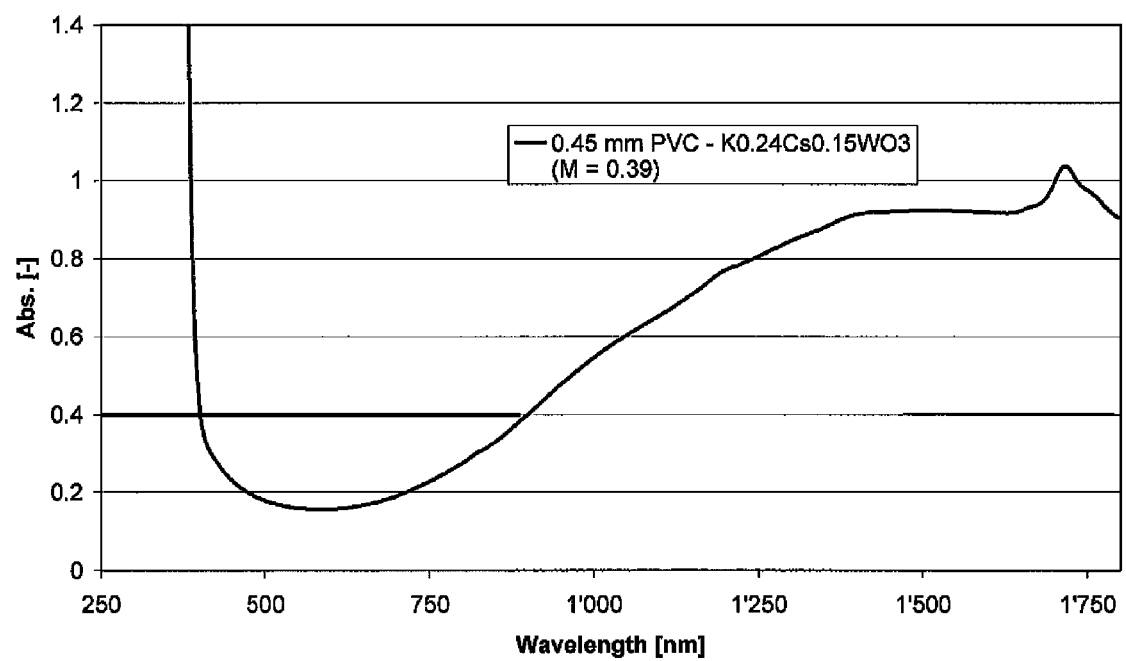

Fig. 4: UV-VIS-NIR-Spectrum of $K_{0.24}Cs_{0.15}WO_3$ 0.1 mm PC film
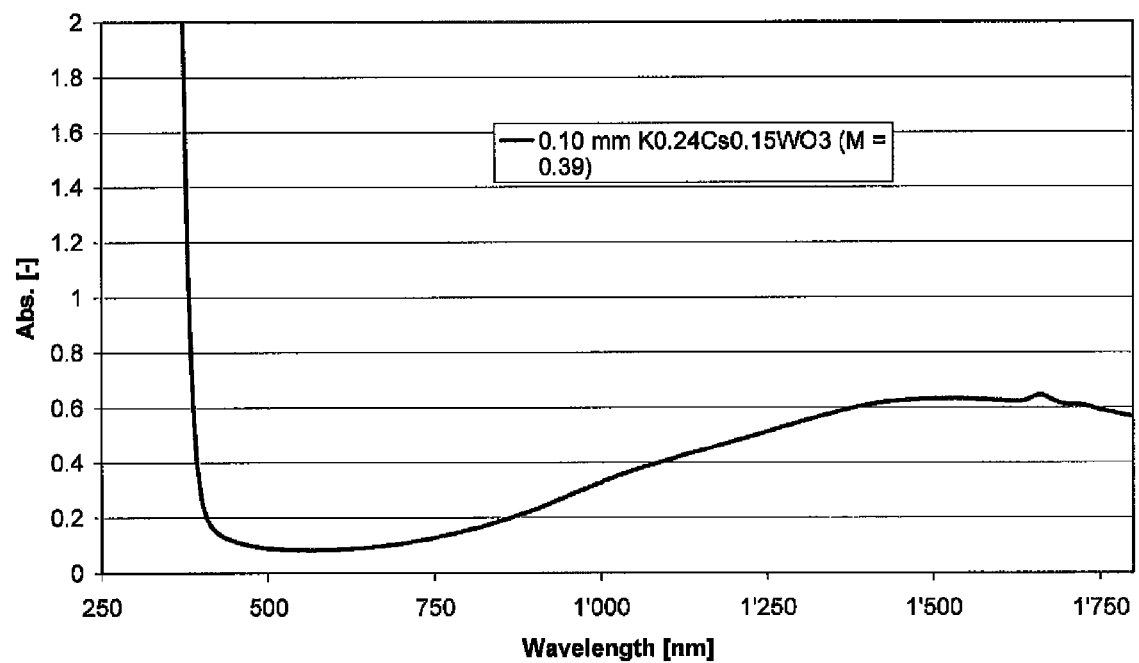

Fig. 5: UV-VIS-NIR-Spectrum of $K_{0.24}Cs_{0.16}WO_3$ 150 micron LDPE film
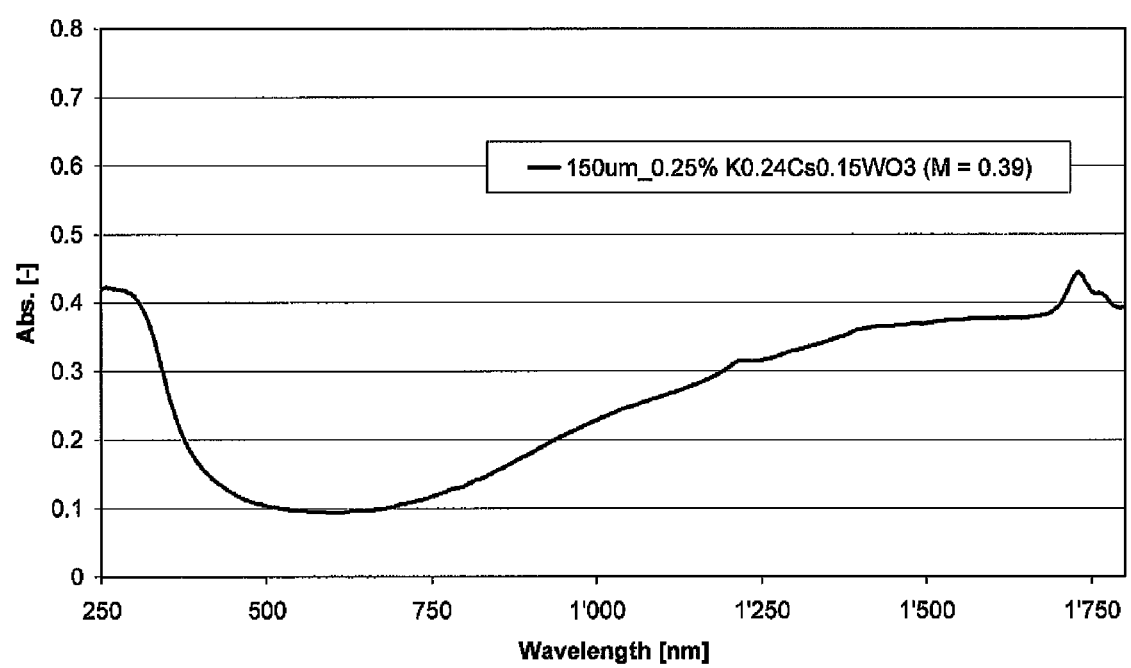

POTASSIUM CESIUM TUNGSTEN BRONZE PARTICLES

This application claims benefit of U.S. provisional app. No. 61/223,519, filed Jul. 7, 2009, the contents of which are incorporated by reference.

The present invention is related to potassium cesium tungsten bronze particles. The particles are for instance nanoparticles. The particles are useful as near infrared (NIR) absorbers and/or heat shielding additives. The additives are employed in organic or inorganic substrates, for instance plastics, coatings, enamels, inks, adhesives, ceramics or glass. The additives are prepared for example by a plasma torch.

It is known that NIR absorption can be achieved by decreasing the oxygen content of tungsten oxide ($WO_3$). This is achieved by exposing tungsten oxide at an elevated temperature to a reducing atmosphere to create a Magneli phase tungsten suboxide ($WO_{3-x}$). NIR absorption can also be achieved with the ternary addition of positive ions under reductive conditions into $WO_3$, which leads to a tungsten bronze structure. For instance, potassium tungsten bronze and cesium tungsten bronze are each known.

J. Am. Ceram. Soc. 90[12], 4059-4061 (2007) teaches nano scaled particles of tungsten oxides.

U.S. 2006/0178254 and U.S. 2007/0187653 disclose particles of each of cesium tungsten bronze and potassium tungsten bronze.

U.S. 2005/0271566 discloses nanoparticles comprising tungsten.

U.S. 2008/0308755 teaches polyester fibers containing $Cs_{0.33}WO_3$ particles.

U.S. 2008/0116426 teaches light absorbent resin compositions for laser welding.

U.S. patents and published applications discussed herein are incorporated by reference.

SUMMARY

Disclosed are potassium cesium tungsten bronze solid solution particles of the formula $K_xCs_yWO_z$, where $x+y \leq 1$ and $2 \leq z \leq 3$.

Also disclosed are organic or inorganic compositions comprising an organic or inorganic substrate and incorporated therein potassium cesium tungsten bronze solid solution particles of the formula $K_xCs_yWO_z$, where $x+y \leq 1$ and $2 \leq z \leq 3$.

Also disclosed is a method for the preparation of potassium cesium tungsten bronze solid solution particles of the formula $K_xCs_yWO_z$, where $x+y \leq 1$ and $2 \leq z \leq 3$, which method comprises mixing a suitable tungsten source with a salt of potassium and a salt of cesium to form a powder mixture and exposing the powder mixture to a plasma torch under a reducing atmosphere.

DETAILED DISCLOSURE

The present potassium cesium tungsten bronze particles exhibit solid solution behavior. That is, they are homogeneous and exist as a single structure. The elemental analysis is determined by a combination of inductively coupled plasma and atomic absorption spectroscopy. High resolution microanalysis by energy dispersive X-ray spectroscopy is used in conjunction with powder X-ray diffraction (PXRD) analysis to confirm that the produced particles are a single phase consisting of a K/Cs solid solution denoted $K_xCs_yWO_3$ rather than two separate K and Cs bronze phases.

The bronze particles are for instance micron or nano scaled. They are for example from about 5 nm to about 10 μm in size. They are for instance from about 20 nm to about 800 nm in size, for example from about 20 nm to about 300 nm or from about 20 nm to about 200 nm in size. This means that greater than 90 percent of the particles (by number) are within these ranges. The size means the longest radius of the particle. Particle size is determined by scanning electron microscopy. A particle size of less than 300 nm is desired to achieve good transparency with minimal haze when the particles are incorporated into a suitable substrate.

The present bronzes exist for instance as a hexagonal phase, as a cubic pyrochlore phase or as a mixture of hexagonal and cubic pyrochlore phases. The most common space groups for the hexagonal phase are $P6_3/mcm$ and $P6_322$, while the most common cubic pyrochlore phase is Fd3m. The value of x is from about 0.01 to about 0.99 and the value of y is from about 0.99 to about 0.1. For instance, x is from about 0.05 to about 0.95 and y is from about 0.95 to about 0.05. For example, x is from about 0.05 to about 0.60 and y is from about 0.60 to about 0.05. For instance, x is from about 0.1 to about 0.50 and y is from about 0.50 to about 0.1.

When x+y is less than about 0.4, a hexagonal bronze phase is obtained as the major phase (>90 wt. %). When x+y is between about 0.4 and 0.6, the particles consist of a mixture of hexagonal and pyrochlore phases. When x+y is above about 0.6, the particles exist mainly as a pyrochlore phase. The hexagonal phase particles are of particular interest due to their high transmission of visible light and high absorption of NIR radiation combined with low haze due to particle size effects. Visible light is defined to be from about 380 nm to about 700 nm. NIR radiation is defined to be from about 700 nm to about 3000 nm.

The value of z is from about 2 to 3 inclusive. For instance z is from about 2.9 to 3.

The shape of the pyrochlore particles are spherical as seen by scanning electron microscopy.

Specific examples of hexagonal phase potassium cesium tungsten bronzes are $K_{0.10}Cs_{0.14}WO_3$ and $K_{0.24}Cs_{0.15}WO_3$. Examples of mixtures of hexagonal phase and pyrochlore phase bronzes are $K_{0.17}Cs_{0.29}WO_3$ and $K_{0.31}Cs_{0.29}WO_3$. An example of a mostly pyrochlore bronze is $K_{0.20}Cs_{0.45}WO_3$.

The present bronzes are prepared from a powder mixture of an appropriate tungsten source and an appropriate potassium salt and an appropriate cesium salt.

Alternatively, the present bronzes may be prepared from a liquid mixture of soluble tungsten, potassium and cesium precursors. Likewise, the present bronzes may be prepared from a combination of solids and liquids where the reactants may be individually fed and combined prior to or during reaction. The feed rate of each component will determine the composition of the final product.

The tungsten source may be chosen from tungstates, tungsten oxides, tungsten metal, tungsten halides and tungsten alkoxides.

Examples are tungstic acid, ammonium tungstates, sodium tungstates, tungsten chloride, tungsten dichloride dioxide or tungsten alkoxides.

Examples of tungsten alkoxides are tungsten isopropoxide, ethoxide and dichloride diethoxide. The alkoxides may be used neat, or acids or bases may be used to keep the precursors dissolved or in the colloidal state (sol-gel chemistry).

Suitable ammonium tungstates include ammonium monotungstate, ammonium paratungstates such as hexatungstate and dodecatungstate and ammonium metatungstate as well as their hydrates. A specific example is ammonium paratungstate (APT), $(NH_4)_{10}W_{12}H_2O_{42} \cdot 4H_2O$. APT is commonly employed as a precursor to produce tungsten oxide and is for example available from Global Tungsten and Powders Corp., formerly Osram Sylvania.

Suitable potassium and cesium salts are for instance carbonates, hydrogen carbonates, halides, acetates, citrates, formats, propionates, oxalates, hydroxides, nitrates, sulfates and chlorates. Any inorganic or organic salt is appropriate which decomposes at relatively low temperature (<1000° C.). The salts may be either anhydrous or hydrated. Suitable halides are potassium chloride and cesium chloride.

Specifically suitable is a powder mixture of APT, cesium formate and tripotassium citrate. The powders are physically mixed and co-fed by means of a powder feeder into a hot plasma zone generated by a plasma torch.

The present bronzes are prepared for example by an induction plasma torch. Plasma reactors are known and are described for instance in U.S. Pat. No. 5,200,595. The present invention employs an RF (radio frequency) induction plasma torch. Induction plasma torches are available for instance from Tekna Plasma Systems Inc., Sherbrooke, Quebec.

The present plasma reactor is equipped with an injection probe designed for powder injection. The powder feed rate is from about 10 to about 50 g/min. The powder feeder is for example a fluidized bed feeder or a vibratory, disc or suspension feeder. Argon is employed as the carrier gas. The sheath gas is comprised for instance of a hydrogen/helium/argon mixture. A hydrogen/noble gas mixture is suitable as the sheath gas. A hydrogen/nitrogen gas mixture is also suitable. The hydrogen content of the sheath gas is optimized to maximize the yield of the target bronze phase while minimizing the yield of fully oxidized phases ($WO_3$, $K_2WO_4$, $Cs_2WO_4$) or a fully reduced $W^0$ phase. A small percent of $W^0$ (about 1 to about 6 wt %) is generally found to be present in the product. The sheath gas composition is advantageously $Ar/H_2/He=100/x/5$ slpm (standard liters per minute) where x is from about 0.25 to about 0.5 splm. The temperature range reached in the plasma hot zone is between about 5,000 to about 10,000 K. Argon is employed as the quench gas and the resulting powder is collected in a bag filter.

The residence time of the powder reactants is on the order of milliseconds, for instance from about 0.005 to about 0.5 seconds. The torch power is from about 15 to about 200 kW. For example, the torch power is about 65 kW.

Thermal plasma torches other than RF may be employed, for example a DC arc plasma torch or a microwave discharge plasma.

The reactor pressure range is from about 200 torr to atmospheric pressure, or from about 400 to about 700 torr.

In the preparation of the present bronzes, some potassium is lost during the plasma synthesis. The final stoichiometry of the bronzes contains much less potassium than the starting ratio. Therefore, a large excess of potassium salt is employed in order to arrive at the present bronze particles. Suitable starting ratios are from about 0.05 mol to about 5 mol of potassium and from about 0.05 mol to about 0.5 mol cesium based on 1 mol of tungsten.

In addition to the potassium cesium tungsten bronze particles, small amounts of particles of W and $WO_3$ are normally present in the final product. For example, the final product contains greater than 90% by weight bronze and less than 10% by weight W and $WO_3$.

The present bronze particles may be further functionalized at the surface, for example by silanization or by the use of thiols, amines, phosphines, stearates, etc.

The present bronze particles are employed in plastics, coatings, inks, adhesives, ceramics or glass as heat shielding, light management, heat management, energy management or solar control additives. Important applications are laser welding, security features (e.g. security printing of banknotes), marking, tracers and heat localization, heat transfer or heat shielding. The present particles may be employed for NIR curing and drying of coatings or inks. The particles may be employed for NIR curing and drying of adhesives, for NIR drying of offset prints, for NIR drying of paper coatings, for heating plastic preforms or for NIR fixation of ink toners. The particles may be employed for NIR laser marking of paper or plastics, for NIR laser soldering of glass, or as NIR optical filters, e.g. for plasma display panels or protective goggles. The particles may be employed for absorbing NIR radiation in plastic for heat management, e.g. Greenhouses or Glazing (e.g. transparent sheets, semitransparent sheets, window films).

The present mixed potassium cesium tungsten bronze solid solution particles surprisingly show excellent transparency in the visible light region while maintaining high absorption in the NIR region. When incorporated into a substrate, the mixed bronze particles have a low impact on visible color, while achieving fast NIR curing and drying speeds and good heat shielding effect.

The present bronze particles are incorporated for instance into organic or inorganic substrates at levels of from about 0.01 to about 15% by weight, based on the weight of the substrate (based on solids in the case of coatings, inks or adhesives). For instance, the present particles are employed at a level of from about 0.01 to about 10% by weight, or from about 0.01 to about 5% by weight, based on the weight of the organic or inorganic substrate.

The organic substrates are for instance plastics, coatings, inks or adhesives.

The plastics of the present invention are for instance in the form of films, sheets, fibers or molded or cast articles. They are for instance films or sheets employed in architectural glazing, glazing in building and construction, automotive glazing, transportation glazing or agricultural films and structures or even films which are put on glass. The materials may be solid sheets, monolithic sheets, twin wall sheets, multi wall sheets, flat sheets, corrugated sheets, films, oriented or mono or biaxially oriented films, lamination films or capstock films.

Specific applications include wintergarden and veranda buildings, facades, skylights, pool covers and enclosures, roof structures, vaults, walkways, shelters, signage, interior and exterior design elements, sun shades, windows, panorama roofs and agricultural covers like greenhouses, tunnels and low tunnels.

The present plastic compositions are pigmented or are translucent or are transparent.

The present plastic substrates are for instance selected from the following:
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerization (normally under high pressure and at elevated temperature).
b) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndic-tactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.
11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.
12. Homopolymers and copolymers of cyclic ethers such as polyalkylene glycols, polyethylene oxide, polypropylene oxide or copolymers thereof with bisglycidyl ethers.
13. Polyacetals such as polyoxymethylene and those polyoxymethylenes which contain ethylene oxide as a comonomer; polyacetals modified with thermoplastic polyurethanes, acrylates or MBS.
14. Polyphenylene oxides and sulfides, and mixtures of polyphenylene oxides with styrene polymers or polyamides.
15. Polyurethanes derived from hydroxyl-terminated polyethers, polyesters or polybutadienes on the one hand and aliphatic or aromatic polyisocyanates on the other, as well as precursors thereof.
16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).
17. Polyureas, polyimides, polyamide-imides, polyetherimids, polyesterimids, polyhydantoins and polybenzimidazoles.
18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.
19. Polycarbonates and polyester carbonates.
20. Polyketones.
21. Polysulfones, polyether sulfones and polyether ketones.
22. Crosslinked polymers derived from aldehydes on the one hand and phenols, ureas and melamines on the other hand, such as phenol/formaldehyde resins, urea/formaldehyde resins and melamine/formaldehyde resins.
23. Drying and non-drying alkyd resins.
24. Unsaturated polyester resins derived from copolyesters of saturated and unsaturated dicarboxylic acids with polyhydric alcohols and vinyl compounds as crosslinking agents, and also halogen-containing modifications thereof of low flammability.
25. Crosslinkable acrylic resins derived from substituted acrylates, for example epoxy acrylates, urethane acrylates or polyester acrylates.
26. Alkyd resins, polyester resins and acrylate resins crosslinked with melamine resins, urea resins, isocyanates, isocyanurates, polyisocyanates or epoxy resins.
27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.
28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.
29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The present polymer compositions comprise especially polycarbonate or a coating or coextruded layer on polycarbonate, polyesters, acrylics, halogenated polymers such as polyvinylchloride, polyvinyl butyral, polyolefins, aromatic homopolymers and copolymers derived from vinyl aromatic monomers and graft copolymers thereof such as acrylonitrile-butadiene-styrene (ABS). The present compositions for instance contain these polymers as a major component, that is from about 50% to about 100% by weight.

The present polymer compositions in particular are selected from polycarbonate, polymethylmethacrylate, polyethyleneterephthalate (PET as well as PETG and PCTG), ABS, polyvinylidene fluoride, polyvinylchloride, polyvinyl butyral styrene-acrylonitrile copolymer (SAN), polyamide, polystyrene, polybutylene terephthalate, polyurethane, polypropylene and polyethylene, including blends, alloys and copolymers.

Compositions of the present invention are preferably unplasticized. Compositions of the invention do not require any further metals or metallic particles and usually do not contain such components.

Of special interest are rigid, transparent compositions such as plates or sheets for automotive or architectural glazings or translucent or transparent polyolefin or polyolefin copolymer films, especially for agricultural applications.

The present substrate may also be a coating formulation or a cured coating comprising a suitable binder. The binder can in principle be any binder which is customary in industry, for example those described in Ullmann's Encyclopedia of Industrial Chemistry, 5th Edition, Vol. A18, pp. 368-426, VCH, Weinheim 1991. In general, it is a film-forming binder based on a thermoplastic or thermosetting resin, predominantly on a thermosetting resin. Examples thereof are alkyd, acrylic, polyester, phenolic, melamine, epoxy and polyurethane resins and mixtures thereof.

The binder can be a cold-curable or hot-curable binder; the addition of a curing catalyst may be advantageous. Suitable catalysts which accelerate curing of the binder are described, for example, in Ullmann's Encyclopedia of Industrial Chemistry, Vol. A18, p. 469, VCH Verlags-gesellschaft, Weinheim 1991.

Preference is given to coating compositions in which the binder comprises a functional acrylate resin and a crosslinking agent.

Examples of coating compositions containing specific binders are:

1. paints based on cold- or hot-crosslinkable alkyd, acrylate, polyester, epoxy or melamine resins or mixtures of such resins, if desired with addition of a curing catalyst;
2. two-component polyurethane paints based on hydroxyl-containing acrylate, polyester or polyether resins and aliphatic or aromatic isocyanates, isocyanurates or polyisocyanates;
3. two-component polyurethane paints based on thiol-containing acrylate, polyester or polyether resins and aliphatic or aromatic isocyanates, isocyanurates or polyisocyanates;
4. one-component polyurethane paints based on blocked isocyanates, isocyanurates or polyisocyanates which are deblocked during baking, if desired with addition of a melamine resin;
5. one-component polyurethane paints based on aliphatic or aromatic urethanes or polyurethanes and hydroxyl-containing acrylate, polyester or polyether resins;
6. one-component polyurethane paints based on aliphatic or aromatic urethaneacrylates or polyurethaneacrylates having free amino groups within the urethane structure and melamine resins or polyether resins, if necessary with curing catalyst;
7. two-component paints based on (poly)ketimines and aliphatic or aromatic isocyanates, isocyanurates or polyisocyanates;
8. two-component paints based on (poly)ketimines and an unsaturated acrylate resin or a polyacetoacetate resin or a methacrylamidoglycolate methyl ester;
9. two-component paints based on carboxyl- or amino-containing polyacrylates and polyepoxides;
10. two-component paints based on acrylate resins containing anhydride groups and on a polyhydroxy or polyamine component;
11. two-component paints based on acrylate-containing anhydrides and polyepoxides;
12. two-component paints based on (poly)oxazolines and acrylate resins containing anhydride groups, or unsaturated acrylate resins, or aliphatic or aromatic isocyanates, isocyanurates or polyisocyanates;
13. two-component paints based on unsaturated polyacrylates and polymalonates;
14. thermoplastic polyacrylate paints based on thermoplastic acrylate resins or externally crosslinking acrylate resins in combination with etherified melamine resins;
15. paint systems based on siloxane-modified or fluorine-modified acrylate resins;
16. paint systems, especially for clearcoats, based on malonate-blocked isocyanates with melamine resins (e.g. hexamethoxymethylmelamine) as crosslinker (acid catalyzed);
17. UV-curable systems based on oligomeric urethane acrylates and/or acrylatacrylaten, if desired in combination with other oligomers or monomers;
18. dual cure systems, which are cured first by heat and subsequently by UV or electron irradiation, or vice versa, and whose components contain ethylenic double bonds capable to react on irradiation with UV light in presence of a photoinitiator or with an electron beam.

Coating systems based on siloxanes are also possible, e.g. systems described in U.S. Pat. Nos. 6,288,150, 6,306,512, 4,315,091 or 6,228,921.

In addition, the coating composition according to the invention preferably comprises a light stabilizer of the sterically hindered amine type, the 2-(2-hydroxyphenyl)-1,3,5-triazine and/or 2-hydroxyphenyl-2H-benzotriazole type, for example as mentioned below. Of special technical interest is the addition of compounds of the classes 2-resorcinyl-4,6-diphenyl-1,3,5-triazine, 2-resorcinyl-4,6-bis(biphenylyl)-1,3,5-triazine, and/or 2-hydroxyphenyl-2H-benztriazole.

The coating composition can also comprise further components, examples being solvents, pigments, dyes, plasticizers, stabilizers, rheologic or thixotropic agents, drying catalysts and/or levelling agents. Examples of possible components are described in Ullmann's Encyclopedia of Industrial Chemistry, 5th Edition, Vol. A18, pp. 429-471, VCH, Weinheim 1991.

Possible drying catalysts or curing catalysts are, for example, free (organic) acids or bases, or (organic) blocked acids or bases which may be deblocked by thermal treatment or irradiation, organometallic compounds, amines, amino-containing resins and/or phosphines. Examples of organometallic compounds are metal carboxylates, especially those of the metals Pb, Mn, Co, Zn, Zr or Cu, or metal chelates, especially those of the metals Al, Ti, Zr or Hf, or organometallic compounds such as organotin compounds.

Examples of metal carboxylates are the stearates of Pb, Mn or Zn, the octoates of Co, Zn or Cu, the naphthenates of Mn and Co or the corresponding linoleates, resinates or tallates.

Examples of metal chelates are the aluminium, titanium or zirconium chelates of acetylacetone, ethyl acetylacetate, salicylaldehyde, salicylaldoxime, o-hydroxyacetophenone or ethyl trifluoroacetylacetate, and the alkoxides of these metals.

Examples of organotin compounds are dibutyltin oxide, dibutyltin dilaurate or dibutyltin dioctoate.

Examples of amines are, in particular, tertiary amines, for example tributylamine, triethanolamine, N-methyldiethanolamine, N-dimethylethanolamine, N-ethylmorpholine, N-methylmorpholine or diazabicyclooctane (triethylenediamine), diazabicycloundecene, DBN (=1,5-diazabicyclo[4.3.0]non-5-ene), and salts thereof. Further examples are quaternary ammonium salts, for example trimethylbenzylammonium chloride.

Amino-containing resins are simultaneously binder and curing catalyst. Examples thereof are amino-containing acrylate copolymers.

The curing catalyst used can also be a phosphine, for example triphenylphosphine.

The coating compositions can also be radiation-curable coating compositions. In this case, the binder essentially comprises monomeric or oligomeric compounds containing ethylenically unsaturated bonds (prepolymers), which after application are cured by actinic radiation, i.e. converted into a crosslinked, high molecular weight form. Where the system is UV curing, it generally contains at least one photoinitiator as well. Corresponding systems are described in the above-mentioned publication Ullmann's Encyclopedia of Industrial Chemistry, 5th Edition, Vol. A18, pages 451-453. In radiation-curable coating compositions, the additives can also be employed without the addition of sterically hindered amines.

The coating compositions according to the invention can be applied to any desired substrates, for example to metal, wood, plastic or ceramic materials. They are preferably used as topcoat in the finishing of automobiles. If the topcoat comprises two layers, of which the lower layer is pigmented and the upper layer is not pigmented, the novel coating composition can be used for either the upper or the lower layer or for both layers, but preferably for the upper layer.

The coating compositions can be applied to the substrates by the customary methods, for example by brushing, spraying, pouring, dipping or electrophoresis; see also Ullmann's Encyclopedia of Industrial Chemistry, 5th Edition, Vol. A18, pp. 491-500.

Depending on the binder system, the coatings can be cured at room temperature or by heating. The coatings are preferably cured at 50-150° C., and in the case of powder coatings or coil coatings even at higher temperatures.

The coatings obtained in accordance with the invention have excellent resistance to the damaging effects of light, oxygen and heat; particular mention should be made of the good light stability and weathering resistance of the coatings thus obtained, for example paints.

The coating compositions can comprise an organic solvent or solvent mixture in which the binder is soluble. The coating composition can otherwise be an aqueous solution or dispersion. The vehicle can also be a mixture of organic solvent and water. The coating composition may be a high-solids paint or can be solvent-free (e.g. a powder coating material). Powder coatings are, for example, those described in Ullmann's Encyclopedia of Industrial Chemistry, 5th Ed., A18, pages 438-444. The powder coating material may also have the form of a powder-slurry (dispersion of the powder preferably in water).

The pigments can be inorganic, organic or metallic pigments. The coating compositions may contain no pigments and may be used as a clearcoat.

The present substrate material may also be an inorganic polymer composition or organic/inorganic polymer hybrid system, e.g. a sol-gel coating. Examples are metal oxide systems based on metal alkoxides such as Si, Ti, Xr, Al alkoxides, or hybrid coatings based on a mixture of resin+ metal alkoxide; examples for such systems and their preparation are given in U.S. 20070187653, or U.S. 2006178254, which applications are hereby incorporated by reference.

Inks are for instance printing inks. The inks may be radiation curable inks.

The present radiation curable inks or coatings may also be thermally cured.

Coating and inks may be water based or organic solvent based.

The present bronze particles may be employed in radiation curable inks or coatings compositions to induce NIR curing. They may be employed together with or without thermal radical initiators or UV photoinitiators. They are suitable in transparent clear coatings or in coatings containing high levels of pigments, for example high levels of $TiO_2$. They induce curing in heavily pigmented coatings where UV, visible light or NIR light is absorbed or reflected by the pigments.

The inorganic substrates are for instance glass or ceramics.

The present bronze particles may be employed as an additive in laser marking of glass, ceramic, metal or enamel surfaces and for applying conductive silver coatings to the same temperature resistant substrates.

$K_xCs_yWO_3$ may be employed as an additive in near infrared-absorbing paste compositions containing silver powder, borosilicate glass frit, and organic medium. This is as taught in U.S. 2009/0029057, incorporated by reference.

$K_xCs_yWO_3$ may be employed as an additive for laser marking the surface of a substrate by applying a marking material comprising a plurality of glass frit precursors. This is as disclosed in U.S. Pat. No. 6,238,847, incorporated by reference.

The organic compositions of the invention may optionally also contain from about 0.01 to about 5%, preferably from about 0.025 to about 2%, and especially from about 0.1 to about 1% by weight of various conventional additives, such as the materials listed below, or mixtures thereof.

1. Antioxidants
    1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol and mixtures thereof.
    1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.
    1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.
    1.4. Tocopherols, for example α-tocopherol, β-tocopherol, γ-tocopherol, δ-tocopherol and mixtures thereof (Vitamin E).
    1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3- methylphenol), 4,4'-thiobis(6-tert-butyl-2-methylphenol), 4,4'-thiobis-(3,6-di-sec-amylphenol), 4,4'-bis (2,6-dimethyl-4-hydroxyphenyl)disulfide.
    1.6. Alkylidenebisphenols, for example 2,2'-methylenebis (6-tert-butyl-4- methylphenol), 2,2'-methylenebis(6-tert-butyl-4- ethylphenol), 2,2'-methylenebis[4-methyl-6-(α-methylcyclohexyl)phenol], 2,2'- methylenebis(4-methyl-6-cyclohexylphenol), 2,2'-methylenebis(6-nonyl-4- methylphenol), 2,2'- methylenebis (4,6-di-tert-butylphenol), 2,2'-ethylidenebis (4,6-di-tert-butylphenol), 2,2'-ethylidenebis(6-tert-butyl-4-isobutylphenol), 2,2'- methylenebis[6-(α-methylbenzyl)-4-nonylphenol], 2,2'-methylenebis[6-(α,α-dimethylbenzyl)-4-nonylphenol], 4,4'-methylenebis(2,6-di-tert- butylphenol), 4,4'-methylenebis(6-tert-butyl-2-methylphenol), 1,1-bis(5-tert-butyl-4-hydroxy-2- methylphenyl)butane, 2,6-bis (3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3- bis(3-tert-butyl-4-hydroxyphenyl)butyrate], bis(3-tert-butyl-4-hydroxy-5-methylphenyl)dicyclopentadiene, bis[2-(3' tert-butyl-2-hydroxy-5-methylbenzyl)-6-tert-butyl-4- methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.
    1.7. Benzyl compounds, for example 3,5,3',5'-tetra-tert-butyl-4,4'-dihydroxydibenzyl ether, octadecyl-4-hydroxy-3,5- dimethyl benzylmercaptoacetate, tridecyl-4-hydroxy-3,5-di-tert- butylbenzylmercaptoacetate, tris (3,5-di-tert-butyl-4- hydroxybenzyl)amine, 1,3,5-tri-(3,5-di-tert- butyl-4-hydroxybenzyl)-2,4,6-trimethylbenzene, di-(3,5-di-tert-butyl-4-hydroxybenzyl) sulfide, 3,5-di-tert-butyl-4- hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl) isocyanurate, 1,3,5-tris-(4-tert-butyl-3-hydroxy-2,6-dimethylbenzyl) isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, calcium-salt.

1.8. Hydroxybenzylated malonates, for example dioctadecyl-2,2-bis-(3,5-di-tert-butyl-2-hydroxybenzyl)-malonate, dioctadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxy-benzyl) isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxy-phenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexane-diol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-di-isopropyl-p- phenylenediamine, N,N'- di-sec-butyl-p-phenylenediamine, N,N'-bis(1,4- dimethylpentyl)-p-phenylenediamine, N,N'-bis(1-ethyl-3-methylpentyl)-p-phenylenediamine, N,N'- bis (1- methylheptyl)-p-phenylenediamine, N,N'- dicyclohexyl-p-phenylenediamine, N,N'- diphenyl-p-phenylenediamine, N,N'-bis(2-naphthyl)-p-phenylenediamine, N- isopropyl-N'-phenyl-p-phenylenediamine, N-(1,3- dimethylbutyl)- N'-phenyl-p-phenylenediamine, N-(1- methylheptyl)-N'-phenyl-p-phenylenediamine, N-cyclohexyl-N'-phenyl-p-phenylenediamine, 4-(p-toluenesulfamoyl) diphenylamine, N,N'-dimethyl-N,N'-di-sec-butyl-p-phenylenediamine, diphenylamine, N-allyldiphenylamine, 4- isopropoxydiphenylamine, N-phenyl-1-naphthylamine, N- (4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl) amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl) biguanide, bis[4-(1',3'-dimethylbutyl)phenyl]amine, tert-octylated N-phenyl-1-naphthylamine, a mixture of mono- and dialkylated tert-butyl/tert-octyl-diphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol.

2. UV Absorbers and Light Stabilizers 2.1. 2-(2-Hydroxyphenyl)-2H-benzotriazoles, for example known commercial hydroxyphenyl-2H-1-benzotriazoles and benzotriazoles as disclosed in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905, 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218 such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl(ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates and malonates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, β-carbomethoxy-p-methoxy-cinnamic acid methyl ester, N-(β-carbomethoxy-β-cyanovinyl)-2-methyl-indoline, Sanduvor® PR25, dimethyl p-methoxybenzylidenemalonate (CAS# 7443-25-6), and Sanduvor® PR31, di-(1,2,2,6,6-pentamethylpiperidin-4-yl) p-methoxybenzylidenemalonate (CAS #147783-69-5).

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amine stabilizers, for example 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, bis(2,2,6,6-tetramethyl-4-piperidyl) sebacate, bis(2,2,6,6-tetramethyl-4-piperidyl) succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)-hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6, 6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl) hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

The sterically hindered amine may also be one of the compounds described in U.S. Pat. No. 5,980,783, the relevant parts of which are hereby incorporated by reference, that is compounds of component I-a), I-b), I-c), I-d), I-e), I-f), I-g), I-h), I-i), I-j), I-k) or I-l), in particular the light stabilizer 1-a-1, 1-a-2, 1-b-1, 1-c-1, 1-c-2, 1-d-1, 1-d-2, 1-d-3, 1-e-1, 1-f-1, 1-g-1, 1-g-2 or 1-k-1 listed on columns 64-72 of said U.S. Pat. No. 5,980,783.

The sterically hindered amine may also be one of the compounds described in U.S. Pat. Nos. 6,046,304 and 6,297,299, the disclosures of which are hereby incorporated by reference, for example compounds as described in claim 10 or 38 or in Examples 1-12 or D-1 to D-5 therein.

2.7. Sterically hindered amines substituted on the N-atom by a hydroxy-substituted alkoxy group, for example compounds such as 1-(2-hydroxy-2-methylpropoxy)-4-octadecanoyloxy-2,2,6,6-tetramethylpiperidine, 1-(2-hydroxy-2-methylpropoxy)-4-hexadecanoyloxy-2,2,6,6-tetramethylpiperidine, the reaction product of 1-oxyl-4-hydroxy-2,2,6,6-tetramethylpiperidine with a carbon radical from t-amylalcohol, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl) sebacate, bis(1-(2-hydroxy-2-methylpropoxy)-2,2,6,6-tetramethylpiperidin-4-yl) adipate, bis(1-(2-hydroxy-2-methylpropoxy)-2,2,6,6-tetramethylpiperidin-4-yl) succinate, bis(1-(2-hydroxy-2-methylpropoxy)-2,2,6,6-tetramethylpiperidin-4-yl) glutarate and 2,4-bis{N-[1-(2-hydroxy-2-methylpropoxy)-2,2,6,6-tetramethylpiperidin-4-yl]-N-butylamino}-6-(2-hydroxyethylamino)-s-triazine.

2.8. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.9. Tris-aryl-o-hydroxyphenyl-s-triazines, for example known commercial tris-aryl-o-hydroxyphenyl-s-triazines and triazines as disclosed in, U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,736,597; 5,942,626; 5,959,008; 5,998,116; 6,013,704; 6,060,543; 6,242,598 and 6,255,483, for example 4,6-bis-(2,4-dimethylphenyl)-2-(2-hydroxy-4-octyloxyphenyl)-s-triazine, Cyasorb® 1164, Cytec Corp, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxyethoxy)phenyl]-6-(4-chlorophenyl)-s-triazine, 2,4-bis[2-hydroxy-4-(2-hydroxy-4-(2-hydroxyethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyl-oxycarbonylethylideneoxyphenyl)-s-triazine, 2-phenyl-4-[2-hydroxy-4-(3-sec-butyloxy-2-hydroxy-propyloxy)phenyl]-6-[2-hydroxy-4-(3-sec-amyloxy-2-hydroxypropyloxy)phenyl]-s-triazine, 2,4-bis(2,4-dimethylphenyl)-6-[2-hydroxy-4-(3-benzyloxy-2-hydroxypropyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonylisopropylideneoxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl]-s-triazine, mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, Tinuvin® 400, Ciba Specialty Chemicals Corp., 4,6-bis-(2,4-dimethylphenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxy-phenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl) pentaerythritol diphosphite, bis(2,4,6-tris(tert-butylphenyl) pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-dibenzo[d,f][1,3,2]dioxaphosphepin, 6-fluoro-2,4,8,10-tetra-tert-butyl-12-methyl-dibenzo[d,g][1,3,2]dioxaphosphocin, bis(2,4-di-tert-butyl-6-methylphenyl) methyl phosphite, bis(2,4-di-tert-butyl-6-methylphenyl)ethyl phosphite, 2,2',2''-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite.

Especially preferred are the following phosphites:

Tris(2,4-di-tert-butylphenyl) phosphite (Irgafos®168, Ciba Specialty Chemicals Corp.), tris(nonylphenyl) phosphite,

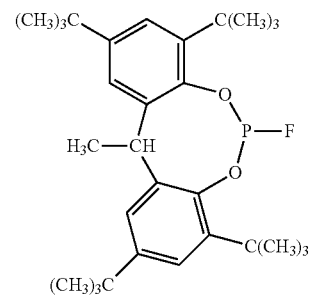

(A)

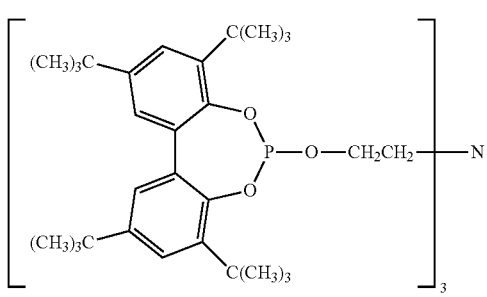

(B)

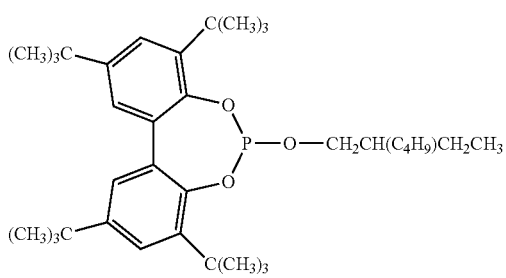

(C)

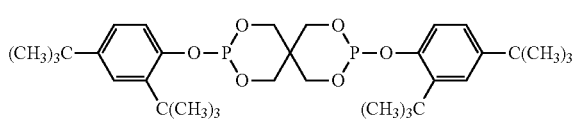

(D)

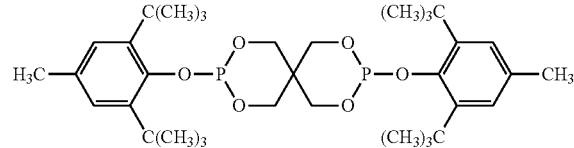

(E)

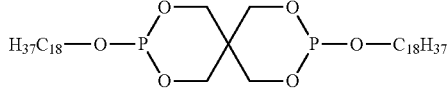

(F)

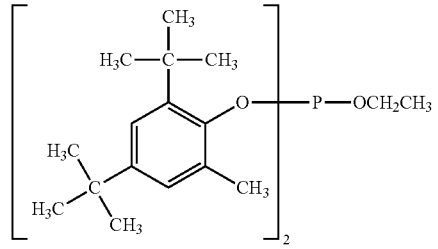

(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxyamine, N,N-dihexadecylhydroxylamine, N,N-dioctadecylhydroxylamine, N-hexadecyl-N-octadecylhydroxylamine, N-heptadecyl-N-octadecylhydroxylamine, N-methyl-N-octadecylhydroxylamine and the N,N-dialkylhydroxylamine derived from hydrogenated tallow amine.

6. Nitrones, for example N-benzyl-α-phenylnitrone, N-ethyl-α-methylnitrone, N-octyl-α-heptylnitrone, N-lauryl-α-undecylnitrone, N-tetradecyl-α-tridcylnitrone, N-hexadecyl-α-pentadecylnitrone, N-octadecyl-α-heptadecylnitrone, N-hexadecyl-α-heptadecylnitrone, N-ocatadecyl-α-pentadecylnitrone, N-heptadecyl-α-heptadecylnitrone, N-octadecyl-α-hexadecylnitrone, N-methyl-α-heptadecylnitrone and the nitrone derived from N,N-dialkylhydroxylamine derived from hydrogenated tallow amine.

7. Amine oxides, for example amine oxide derivatives as disclosed in U.S. Pat. Nos. 5,844,029 and 5,880,191, didecyl methyl amine oxide, tridecyl amine oxide, tridodecyl amine oxide and trihexadecyl amine oxide.

8. Benzofuranones and indolinones, for example those disclosed in U.S. Pat. Nos. 4,325,863, 4,338,244, 5,175,312, 5,216,052, 5,252,643 5,369,159 5,356,966 5,367,008 5,428,177 or 5,428,162 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2-acetyl-5-isooctylphenyl)-5-isooctylbenzofuran-2-one and 3-(2,3-dimethylphenyl)-5,7-di-tert-butyl-benzofuran-2-one.

9. Thiosynergists, for example dilauryl thiodipropionate or distearyl thiodipropionate.

10. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

11. Polyamide stabilizers, for example copper salts in combination with iodides and/or phosphorus compounds and salts of divalent manganese.

12. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example, calcium stearate, zinc stearate, magnesium behenate, magnesium stearate, sodium ricinoleate and potassium palmitate, antimony pyrocatecholate or zinc pyrocatecholate.

13. Nucleating agents, for example inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

14. Fillers and reinforcing agents, for example calcium carbonate, silicates, glass fibers, glass bulbs, asbestos, talc, kaolin, mica, barium sulfate, metal oxides and hydroxides, carbon black, graphite, wood flour and flours or fibers of other natural products, synthetic fibers.

15. Dispersing Agents, such as polyethylene oxide waxes or mineral oil.

16. Other additives, for example plasticizers, lubricants, emulsifiers, pigments, dyes, optical brighteners, rheology additives, catalysts, flow-control agents, slip agents, crosslinking agents, crosslinking boosters, halogen scavengers, smoke inhibitors, flameproofing agents, antistatic agents, clarifiers such as substituted and unsubstituted bisbenzylidene sorbitols, benzoxazinone UV absorbers such as 2,2'-p-phenylene-bis(3,1-benzoxazin-4-one), Cyasorb® 3638 (CAS# 18600-59-4), and blowing agents.

In particular, further additives are selected from the organic phosphorus stabilizers, hindered phenol antioxidants, hydroxylamines, hindered amines and hydroxyphenylbenzotriazole or hydroxyphenyltriazine UV absorbers.

The bronze particles may be incorporated into coatings or inks or adhesives compositions by known techniques, for example by standard dispersing techniques as known by those skilled in the art.

The present bronze particles may be incorporated into plastic substrates, coatings, inks or adhesives by standard additive blending techniques using a mixer, kneader or extruder.

The bronzes of the invention and optional further additives may be added to the plastic, coating, ink or adhesive substrate individually or mixed with one another. If desired, the individual components can be mixed with one another before incorporation into the substrate for example by dry blending, compaction or in the melt.

The incorporation of the bronze particles and optional further additives of the invention is carried out by known methods such as dry blending in the form of a powder, or wet mixing in the form of solutions, dispersions or suspensions for example in an inert solvent, water or oil. The additives of the invention may be incorporated, for example, before or after molding or also by applying the dissolved or dispersed additive or additive mixture to the substrate, with or without subsequent evaporation of the solvent or the suspension/dispersion agent. They may be added directly into the processing apparatus (e.g. extruders, internal mixers, etc.), e.g. as a dry mixture or powder or as a solution or dispersion or suspension or melt.

The incorporation can be carried out in any heatable container equipped with a stirrer, e.g. in a closed apparatus such as a kneader, mixer or stirred vessel. The incorporation is preferably carried out in an extruder or in a kneader. It is immaterial whether processing takes place in an inert atmosphere or in the presence of oxygen.

The addition of the present additives to the plastic substrate can be carried out in all customary mixing machines in which the plastic is melted and mixed with the additives. Suitable machines are known to those skilled in the art. They are predominantly mixers, kneaders and extruders.

Processing includes extrusion, co-kneading, pultrusion, compression molding, sheet extrusion, thermoforming, injection molding, rotational molding, casting or polymerization. The process is preferably carried out in an extruder by introducing the additives during melt processing.

Particularly preferred processing machines are single-screw extruders, contrarotating and corotating twin-screw extruders, rotomolding devices, planetary-gear extruders, ring extruders or cokneaders. It is also possible to use processing machines provided with at least one gas removal compartment to which a vacuum can be applied.

Suitable extruders and kneaders are described, for example, in *Handbuch der Kunststoffextrusion, Vol.* 1 *Grundlagen*, Editors F. Hansen, W. Knappe, H. Potente, 1989, pp. 3-7, *ISBN*:3-446-14339-4 (*Vol.* 2 *Extrusionsanlagen* 1986, *ISBN* 3-446-14329-7).

For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components are added, these can be premixed or added individually.

The bronze particles of the invention and optional further additives can also be added to the plastic substrate in the form of a masterbatch ("concentrate") which contains the components in a concentration of, for example, about 1% to about 40% and preferably about 2% to about 20% by weight incorporated in a polymer. The polymer may not necessarily be identical to the substrate where the additives are added finally. In such operations, the polymer can be used in the form of powder, granules, solutions, suspensions or in the form of lattices.

Incorporation can take place prior to or during the shaping operation, or by applying the dissolved or dispersed compound to the plastic substrate, with or without subsequent evaporation of the solvent. A further possibility for incorporating the additives of the invention into plastic substrates is to add them before, during or directly after the polymerization of the corresponding monomers or prior to crosslinking. In this context the additives of the invention can be added as is or else in encapsulated form (for example in waxes, oils or polymers).

The materials containing the additives of the invention can be used for the production of extruded or coextruded articles, moldings, rotomolded articles, injection molded articles, blow molded articles, films, sheets, tapes, mono-filaments, fibers, nonwovens, profiles, adhesives or putties or surface coatings.

In a further embodiment of the invention, a further dithiolen metal complex may be employed. These metal complexes are disclosed in e.g. WO 2008/086931. Other inorganic NIR absorbers may be employed, for example lanthanum hexaboride, indium tin oxide (ITO) or antimony tin oxide (ATO). Other suitable inorganic IR absorbers include oxides, hydroxides, sulfides, sulfates and phosphates of metals such as copper, bismuth, iron, nickel, tin, zinc, manganese, zirconium, tungsten, lanthanum or antimony. Other examples include ATO or ITO coated mica.

In a further embodiment, the invention also relates to the co-use of the present bronze particles together with organic NIR absorbers selected from quinone-diimmonium salts, aminium salts, polymetines such as cyanine squaraine, croconaine, phthalocyanine, these metal complexes are disclosed in e.g. WO 2008083918, naphthalocyanine and quaterrylene-bisimide$_{[p1]}$. Further NIR absorbers also include triphenyl phosphorothionates.

The following examples describe certain embodiments of the invention. These examples are not meant to limit the scope of the invention. In the present disclosure, parts and percentages are by weight and temperature is in degrees Celsius unless indicated otherwise.

EXAMPLES

Example 1

Plasma Synthesis and Characterization

Ammonium paratungstate, $(NH_4)_{10}W_{12}H_2O_2O_{42} \cdot 4H_2O$, potassium carbonate and cesium acetate powders are physically mixed together. The powder mixture is entrained into an argon carrier gas by a standard powder feeder. The sheath gas is comprised of $Ar/H_2/He=100/x/5$ slpm (standard liters per minute) where x is between 0.25 to 0.5 slpm. The fluidized powder mixture is fed into a Tekna plasma reactor with a feed rate of 10-50 g/min. A PL-50 induction plasma torch is used as the plasma source at 65 kW. The temperature range typically reached in the plasma hot zone is from about 5,000 to about 10,000 K. The reactant vapor is cooled by a quench gas and the resulting powder is collected in a bag filter.

The following table displays the starting precursor ratio by moles, the elemental composition of the product and the value M (K+Cs). Elemental analysis is determined by inductively coupled plasma and atomic absorption spectroscopy. The identification of crystal phases and quantitative composition are determined by powder X-ray diffraction (PXRD). Potassium is lost during plasma synthesis, therefore a large excess is employed for the starting ratio. For an M value below 0.4, a hexagonal bronze phase is observed. Between 0.4 and 0.6, the sample consists of a mixture of hexagonal and pyrochlore phases. For an M value above 0.6, the sample contains mostly pyrochlore phase.

| starting ratio* | elemental analysis | M |
|---|---|---|
| 2 K/0.15 Cs | $K_{0.10}Cs_{0.14}WO_3$ | 0.24 |
| 5 K/0.15 Cs | $K_{0.24}Cs_{0.15}WO_3$ | 0.39 |
| 2 K/0.3 Cs | $K_{0.17}Cs_{0.29}WO_3$ | 0.46 |
| 5 K/0.3 Cs | $K_{0.31}Cs_{0.29}WO_3$ | 0.60 |
| 2 K/0.5 Cs | $K_{0.20}Cs_{0.46}WO_3$ | 0.66 |

*moles based on tungsten

The sample $K_{0.24}Cs_{0.15}WO_3$ (M=0.39) has an average particle size of less than 200 nm as measured by scanning electron microscopy and exists almost entirely of hexagonal crystals. The particle size is the largest radius of the particle. High resolution dispersive X-ray spectroscopy (EDX) confirms a single phase consisting of a K/Cs solid solution rather than two separate K and Cs bronze phases. An EDX line scan is performed on a single hexagonal crystal. The elements W, K and Cs are analyzed as function of distance along the line scan which traverses both the crystal and the underlying carbon support film. EDX confirms that W, K and Cs are present in this crystal and that the relative quantity of each element corresponds well with the elemental analysis reported in the table. Zero X-ray counts are observed for W, K and Cs in the underlying carbon support film.

The sample $K_{0.24}Cs_{0.15}WO_3$ (M=0.39) is analyzed by a Rietveld refinement procedure where the experimental PXRD pattern is fit to a simulated pattern created from a structural model for the solid solution $K_xCs_yWO_3$ based on a $P6_322$ structure where Cs atoms are placed in the 2b sites and K atoms are placed in the 4e sites. After refinement of the experimental and profile parameters, the site occupancy of K and Cs is refined along with atomic coordinates and thermal paramenters. An excellent fit between the experimental and simulated patterns is demonstrated by the $R_{wp}$ value of 6.22. Based on the refined site occupancies of Cs and K, the calculated composition of our solid solution is $K_{0.24}Cs_{0.13}WO_3$ which is very close to the experimentally determined elemental analysis. The overall composition of the sample is determined to be 93.6 wt % $K_{0.24}Cs_{0.13}WO_3$, 3.24 wt % $Cs_{0.5}WO_3$ (Fd3m structure), and 3.15 wt % W (Im3m structure).

EDX microanalysis confirms that solid solution behavior is also maintained at higher dopant levels, for instance for the M=0.66 sample.

The mixed M=0.39 K/Cs bronze is characterized by UV/NIR spectroscopy at a concentration of 0.5 wt. percent in PVC foils (thickness 0.33-0.35 nm) and compared to potassium tungsten bronze and cesium tungsten bronze. The mixed bronze displays a maximum absorbance at 1500 nm and has low absorbance in the visible region. The absorbance is 2.67 at 1500 nm and 0.33 at 600 nm.

The lower impact on visible coloration is also observed from color data shown below.

| | | | | | absorbance | |
|---|---|---|---|---|---|---|
| sample | L* | C* | h* | contrast | 600 nm | max |
| standard | 93.4 | 3.6 | 97.6 | 66.5 | — | — |
| K/Cs bronze (M = 0.39) | 52.7 | 10.4 | 110.4 | 26.0 | 0.33 | 2.67 (1506 nm) |
| K bronze | 44.4 | 5.8 | 200.7 | 16.6 | 0.50 | 2.62 (1492 nm) |
| Cs bronze | 44.6 | 6.6 | 147.6 | 18.2 | 0.47 | 2.69 (1368 nm) |

The L* value (lightness) demonstrates that the K and Cs bronzes are distinctly darker that the present mixed bronze. The C* value (chroma) shows that the present mixed bronze is brighter than the K and Cs bronzes. The h* value (hue) is the color angle and indicates that the present bronze is slightly yellow to greenish. The K bronze is distinctly bluish to greenish and the Cs bronze is distinctly greenish. The contrast value demonstrates that the present mixed bronze is more transparent than the K and Cs bronzes.

Example 2

IR Curable White Coil Coatings

| Millbase | | Letdown | |
|---|---|---|---|
| DYNAPOL ® LH 530-02 (60%) (Polyester resin) | 35.00 | Millbase | 78.25 |
| DOWANOL ® PM (solvent) | 1.00 | DYNAPOL ® LH 530-02 (60%) | 10.82 |
| EFKA ® 5010 (50%) (wetting agent) | 1.80 | CYMEL ® 303 (98%) (melamine crosslinking agent) | 5.75 |
| EFKA ® 3772 (60%) (leveling agent) | 1.00 | Solvent Naphta 150 | 0.88 |
| AEROSIL ® 200 (fumed silica) | 0.60 | DOWANOL ® PM | 1.00 |
| Solvent Naphta 150 | 5.35 | Butylglycoleacetate | 1.10 |
| ESTASOL ®/DBE (Solvent) | 3.00 | DYNAPOL ® cat. 1203 (50%) (acid catalyst) | 0.70 |
| 50% URAD ® DD 27/50 % Solvent Naphta 150 (acrylic levelling agent) | 0.50 | TINUVIN ® 123 (hindered amine stabilizer) | 1.00 |
| NIR-A/pigments | 30.00 | TINUVIN ®400-2 (85%) (hydroxyphenyltriazine UV absorber) | 0.50 |

A curable polyester coating formulation is prepared. The levels are in parts by weight. The millbase is prepared according to a standard process with a dispermat for pre-mixing and additional milling for 1 hour with a standard disperser. The formulation is then let down. The coatings are applied onto pre-primed white aluminum panels using a slit coater to provide a wet film thickness of about 80 microns. Formulations with $TiO_2$ and mixtures of $TiO_2$ and NIR absorbers are tested. A formulation with 45 weight percent $TiO_2$ is employed as a reference. The NIR absorber is added directly in the milling step or alternatively via a resin free pigment paste. Curing is done with 6 Adphos high burn NIR emitters. The addition of the NIR absorbers allows for reduction in curing time. This allows one to increase the belt speed to increase throughput or to reduce the lamp output to decrease energy use.

Belt speed to cure is determined by the stability of the cured coating against 100 methylethylketone double rubs.

Results are as follows. Levels are in weight percent based on solids.

| $TiO_2$ | NIR absorber | NIR absorber | relative belt speed | $\Delta E$ variation |
|---|---|---|---|---|
| 45.000 | — | — | 100 | 0 |
| 44.900 | 0.100 | $H_{0.53}WO_3$ | 175 | 2.5 |
| 44.950 | 0.050 | $H_{0.53}WO_3$ | 150 | 1.7 |
| 44.975 | 0.025 | $H_{0.53}WO_3$ | 125 | 0.7 |
| 44.900 | 0.100 | $Cs_{0.2}WO_3$ | 175 | 1.7 |
| 44.950 | 0.050 | $Cs_{0.2}WO_3$ | 125 | 0.7 |
| 44.975 | 0.025 | $Cs_{0.2}WO_3$ | 100 | 0.7 |
| 44.900 | 0.100 | $K_{0.33}WO_3$ | 225 | 2.2 |
| 44.950 | 0.050 | $K_{0.33}WO_3$ | 175 | 1.3 |
| 44.975 | 0.025 | $K_{0.33}WO_3$ | 150 | 0.7 |
| 44.900 | 0.100 | $K_{0.24}Cs_{0.15}WO_3$ | 225 | 1.8 |
| 44.950 | 0.050 | $K_{0.24}Cs_{0.15}WO_3$ | 175 | 0.9 |
| 44.975 | 0.025 | $K_{0.24}Cs_{0.15}WO_3$ | 150 | 0.4 |

It is seen that higher loading of NIR absorbers allows for faster belt speed. The present mixed bronze is superior in that it allows for the fasted belt speed with lower impact on the $\Delta E$ value within the CIE-Lab color space.

Example 3

Polyethylene Terephthalate Film Extrusion

Cryo-grinded Eastar 6763 (Eastman, PET-G) is dried in a vacuum oven at 65° C./50 mbar with a slight flow of nitrogen for 8 hours. 3944 g of the polymer powder is mixed with 6.00 g of IRGANOX B 561, 40.00 g of TINUVIN 1577 and 10.00 g of the mixed bronze of hexagonal structure, $K_{0.24}Cs_{0.15}WO_3$ (M=0.39) under nitrogen in a Henschel high speed mixer MTI/M20 FU for 3 minutes. This mixture is then compounded on a Berstorff ZE 25x32D twin screw extruder at 260° C. maximum temperature.

The resulting pellets are dried for four hours in a vacuum oven at 65° C. 0.15 mm film samples are pressmolded on a heatable press at 260° C. for 3 minutes without pressure and then for one minute with 170 bar. The samples are pressed between Teflon films to prevent sticking to the highly polished metal plates. From these films UV-VIS-NIR spectra are recorded on a Shimadzu UV-3101 PC with ISR3100 (Ulbricht sphere) from 250 to 1800 nm with a sampling interval of 1 nm with air as reference.

The spectrum can be seen in FIG. 1.

Example 4

Polyvinyl Butyral (PVB)

For all examples the PVB is plasticized: PVB (Butvar B 72 A from Solutia) is dried under vacuum at 80° C. for 8 hours in a vacuum oven. 536.0 g of PVB is mixed in a Henschel High Speed mixer MTI/M3 blends for 6 minutes with 264.0 g of Solusolv 2075 (Solutia) until the whole liquid is absorbed by the PVB. 41.937 g of this plasticized PVB is mixed with 0.042 g of the mixed bronze of hexagonal structure, $K_{0.24}Cs_{0.15}WO_3$ (M=0.39) and 0.042 g of TINUVIN 326 in a Brabender PL 2000 for 6 minutes at 90° C. under nitrogen. The resulting mixture is then pressmolded on a hot press Suter LP 322 with Teflon spacer for 3 minutes at 100° C. with 170 bar pressure to give 1 mm plaques.

From the resulting plaque UV-VIS-NIR spectra are recorded on a Shimadzu UV-3101PC with ISR3100 (Ulbricht sphere) from 250 to 1800 nm with a sampling interval of 1 nm with air as reference.

The spectrum can be seen in FIG. 2.

Example 5

Polyvinyl Chloride (PVC)

A flexible PVC containing 63.5% of Evipol SH 7020 (Ineos Vinyl) 33.5% DIDP Jayflex (Exxon Mobil Chemicals), 1.5% Drapex 39 (Chemtura) Mark BZ 561 (Chemtura) is used for all samples. 99.80 g of this flexible PVC is mixed with 0.300 g TINUVIN 329, 0.200 g of the mixed bronze of hexagonal structure, $K_{0.24}Cs_{0.15}WO_3$ (M=0.39). This premix is then mixed on a Schwabenthan D-1 two roll mill at 160° C. for 8 minutes and 25 rpm with a friction of 1:1.2. The resulting film has a thickness of 0.45 mm.

From the resulting films UV-VIS-NIR spectra are recorded on a Shimadzu UV-3101PC with ISR3100 (Ulbricht sphere) from 250 to 1800 nm with a sampling interval of 1 nm with air as reference.

The spectrum can be seen in FIG. 3.

Example 6

Polycarbonate Film Extrusion

Cryo-grinded PC (Makrolon 3108, Bayer Material Science) is dried for 8 hours at 120° C. in a vacuum oven under vacuum with a slight nitrogen flow. 2840 g of the powder is mixed in a Henschel high speed mixer MTI/M20 FU for 3 minutes at 80° C. under nitrogen with 2.40 g IRGAFOS 168, 7.5 g mixed bronze of hexagonal structure, $K_{0.24}Cs_{0.15}WO_3$ (M=0.39) and 150.0 g TINUVIN 360. the powder mix is compounded twice on a Berstoff ZE 25×32D at 280° C. The pellets are dried in a hot air dryer for 4 hours at 120° C. and then are used to produce a 100 micron thick cast film on a Collin CR-136/350 sheet extrusion line at a maximum temperature of 280° C.

From the resulting films UV-VIS-NIR spectra are recorded on a Shimadzu UV-3101PC with ISR3100 (Ulbricht sphere) from 250 to 1800 nm with a sampling interval of 1 nm with air as reference.

The spectrum can be seen in FIG. 4.

Example 7

Polyethylene Films 3.75 g of the mixed bronze of hexagonal structure, $K_{0.24}Cs_{0.15}WO_3$ (M=0.39) are added to 1496.25 g of LDPE powder (Riblene®FF29, Polimeri Europa, Italy; density: 0.921 g/cm3; MFI: 0.6 (190° C., 2.16 Kg)) and turbo-mixed. The mixture is extruded at a maximum temperature of 200° C. in a OMC® lab-scale twin-screw extruder. The granules so obtained are blown at a maximum temperature of 210° C. in a Formac® lab-scale blow extruder to a film of about 150 micron thickness.

From the resulting film UV-VIS-NIR spectra are recorded on a Shimadzu UV-3101PC with ISR3100 (Ulbricht sphere) from 250 to 1800 nm with a sampling interval of 1 nm with air as reference.

The spectrum can be seen in FIG. 5.

Example 8

Laser Welding

A present mixed bronze IR absorber is incorporated by means of an injection molding machine into a 2 mm thick polycarbonate sheet at a concentration of 500 ppm. The resulting transparent sheet is welded together with a 1 mm polycarbonate sheet with a 250 watt Nd:YAG laser. The surface is scanned by the laser beam at a speed of 20 mm/sec.

The resulting weld has an excellent connection, is highly transparent, does not show any localized plastic deformation and does not evolve bubbles during welding. No fracture of the joining line is induced from mechanical stress.

Example 9

White Gravure Ink for Laser Marking

A titanium dioxide based white ink is prepared containing 0.1 weight percent on solids of a present mixed bronze. The ink comprises 55 weight percent varnish and 45 weight percent $TiO_2$. The varnish is prepared by mixing 20 parts of a solid copolymer of vinyl acetate and crotonic acid with an acid number of 7.5 mg KOH/g, a molecular weight of 170,000 and a Tg of about 43° C. with 80 parts propyl acetate.

The ink is applied to a white packaging board with a standard K2 bar and dried. A 1 cm square area of the board is lasered (fill 60, 1500 mms, 20 Khz). The optical density of the imaged areas are measured along with the background whiteness. A good image density is observed and the CIE whiteness remains high.

Example 10

Security Printing

An offset ink absorbing IR radiation is prepared containing 5 weight percent on solids of the present K/Cs tungsten bronze material. The ink is prepared on a 3-roll mill and comprises 10 weight percent of high tack varnish (CAS 68458-35-5, alkyd resin), 84 weight percent of a commercial offset varnish and 1 weight percent of a drying agent (based on CAS 136-52-7; cobalt bis(2-ethylhexanoate) and oleic acid, CAS 112-80-1). The ink is printed with offset printing equipment to banknote paper. The print is visually almost colorless, but is clearly visible in the IR range using an IR-viewing device (cut-off filter 715 nm). The print exhibits excellent light fastness and very good resistance against solvents, acids, bases, hydrogen peroxide, sodium sulfite, boiling water etc.

Example 11

Drying of Water Based Adhesives

A polyvinyl acetate water based adhesive with a water content of approx. 67.6 weight percent is modified with 0.1, 0.2 and 0.5 weight percent of the present mixed bronze of hexagonal structure, $K_{0.24}Cs_{0.15}WO_3$. For good dispersion of the bronze, 0.2 weight percent of a high molecular weight acrylic block copolymer dispersant (EFKA 4585 from Ciba) is used. The adhesive is mixed with the additives in a DS 200 disperser.

The adhesive is applied to a white varnished paper substrate at a wet film thickness of 100 microns and the weight loss upon multiple passes under a NIR emitter is followed (HB6 lamp at 70% power, web distance 300 mm, web speed 5 m/min). Upon irradiation, the present mixed bronze allows the modified adhesive to dry faster than the non modified adhesive.

| % weight loss after | No additive | 0.2% additive |
| --- | --- | --- |
| 1 pass | 36.9 | 50.0 |
| 2 passes | 63.6 | 64.6 |
| 3 passes | 65.2 | 66.6 |
| 4 passes | 66.2 | 68.3 |

In a further test setup the weight loss of the adhesive over time is followed when dried with a Mettler HG 63 moisture analyzer. The present mixed bronze additive modified adhesive reaches a constant dry weight after approx. 100 seconds. The non modified adhesive becomes dry only after 150 seconds.

| % weight loss after seconds | No additive | 0.1% additive | 0.2% additive | 0.5% additive |
|---|---|---|---|---|
| 0 | 0 | 0 | 0 | 0 |
| 10 | 1.4 | 4.1 | 3.9 | 3.7 |
| 60 | 24.7 | 50.0 | 55.3 | 54.7 |
| 80 | 34.9 | 60.8 | 63.6 | 64.1 |
| 110 | 49.1 | 65.7 | 64.4 | 66.0 |
| 120 | 53.2 | 65.9 | 64.4 | 66.0 |
| 130 | 56.8 | 65.9 | 64.4 | 66.0 |
| 140 | 59.5 | 65.9 | 64.6 | 66.2 |
| 160 | 63.2 | 65.9 | 64.6 | 66.2 |
| 290 | 67.4 | 65.9 | 64.6 | 66.2 |

BRIEF DESCRIPTION OF THE FIGURES

FIGS. 1-5 are UV-VIS-NIR spectra of the films prepared according to Examples 3-7 respectively.

We claim:

1. Potassium cesium tungsten bronze solid solution particles of the formula $K_xCs_yWO_z$ where $x+y \leq 1$ and $2 \leq z \leq 3$.

2. The tungsten bronze particles according to claim 1, wherein the longest radii of greater than 90 percent of the particles are from about 5 nm to about 10 µm.

3. The tungsten bronze particles according to claim 1, wherein the longest radii of greater than 90 percent of the particles are from about 20 nm to about 300 nm.

4. The tungsten bronze particles according to claim 1, wherein x is from about 0.05 to about 0.95 and y is from about 0.95 to about 0.05.

5. The tungsten bronze particles according to claim 1, wherein x is from about 0.10 to about 0.50 and y is from about 0.50 to about 0.10.

6. The tungsten bronze particles according to claim 1, wherein the particles have a hexagonal tungsten bronze structure.

7. The tungsten bronze particles according to claim 1, wherein the particles have a space group symmetry related to cubic pyrochlore structure.

8. A process for the preparation of potassium cesium tungsten bronze solid solution particles of the formula $K_xCs_yWO_z$ where $x+y \leq 1$ and $2 \leq z \leq 3$, which process comprises mixing a suitable tungsten source with a salt of potassium and a salt of cesium to form a powder mixture and exposing the powder mixture to a plasma torch under a reducing atmosphere.

9. The process according to claim 8, wherein the tungsten source is selected from the group consisting of tungstates, tungsten oxides, tungsten metal, tungsten halides and tungsten alkoxides.

10. The process according to claim 8, wherein the tungsten source is selected from the group consisting of ammonium monotungstate, ammonium hexatungstate, ammonium dodecatungstate, ammonium paratungstate (APT), ammonium metatungstate and their hydrates.

11. The process according to claim 8, wherein the potassium salts and cesium salts are carbonates, halides, acetates, formates, citrates or nitrates.

12. The process according to claim 8, wherein the reducing atmosphere is supplied by a sheath gas comprised of a hydrogen/noble gas mixture.

13. The process according to claim 8, wherein the powder mixture contains from about 0.05 to about 5 mol of potassium and from about 0.05 mol to about 0.5 mol cesium based on 1 mol of tungsten.

14. An organic or inorganic composition comprising an organic or inorganic substrate and incorporated therein potassium cesium tungsten bronze solid solution particles of the formula $K_xCs_yWO_z$, where $x+y \leq 1$ and $2 \leq z \leq 3$.

15. The composition according to claim 8, wherein the substrate is a coating.

16. The composition according to claim 8, wherein the substrate is a near infrared (NIR) curable coating composition.

17. The composition according to claim 8, wherein the substrate is a plastic.

18. The composition according to claim 14, wherein the composition is a plastic composition where the substrate is selected from the group consisting of polycarbonate, polymethylmethacrylate, polyethyleneterephthalate, acrylonitrile-butadiene-styrene, polyvinylidene fluoride, styrene-acrylonitrile, polyamide, polystyrene, polybutylene terephthalate, polyurethane, polyvinyl butyral, polyvinylchloride, polypropylene, polyethylene and blends, alloys or copolymers thereof.

19. The composition according to claim 14, wherein the substrate is an ink.

20. The composition according to claim 14, wherein the substrate is an adhesive.

21. The composition according to claim 14, wherein the substrate is a ceramic.

22. The composition according to claim 14, wherein the substrate is a glass.

23. The composition according to claim 14, wherein the composition is a plastic composition in the form of a plate, sheet or film.

24. The composition according to claim 14, wherein the composition comprising a further additive selected from the group consisting of organic phosphorus stabilizers, hindered phenol antioxidants, hydroxylamines, hindered amine light stabilizers and hydroxyphenylbenzotriazole or hydroxyphenyltriazine UV absorbers.

25. The composition according to claim 24, wherein the composition comprising at least one additional inorganic or organic NIR absorber.

26. The composition according to claim 14, wherein the composition comprising at least one additional inorganic or organic NIR absorber.

* * * * *